United States Patent

Takeshita et al.

[11] Patent Number: 6,057,039
[45] Date of Patent: May 2, 2000

[54] COATING COMPOSITION

[75] Inventors: Katsuyoshi Takeshita; Jun Kinoshita, both of Naganoken, Japan

[73] Assignee: Seiko Epson Corporation, Tokyo, Japan

[21] Appl. No.: 08/981,226

[22] PCT Filed: Apr. 18, 1997

[86] PCT No.: PCT/JP97/01349

§ 371 Date: Jul. 6, 1998

§ 102(e) Date: Jul. 6, 1998

[87] PCT Pub. No.: WO97/41185

PCT Pub. Date: Nov. 6, 1997

[30] Foreign Application Priority Data

Apr. 26, 1996 [JP] Japan .................................. 8-107973

[51] Int. Cl.$^7$ ............................. G02B 1/11; C09D 201/00
[52] U.S. Cl. ...................... 428/447; 359/580; 359/581; 428/412; 428/425.5; 428/451; 524/780; 524/783; 524/785; 524/786; 528/14; 528/15; 528/16; 528/17; 528/18; 528/19
[58] Field of Search ................... 359/580, 581; 428/447, 451, 412, 425.5; 524/780, 783, 785, 786; 528/14, 15, 16, 17, 18, 19

[56] References Cited

U.S. PATENT DOCUMENTS 4,908,065  3/1990  Tanitsu et al. ...................... 106/287.24
5,314,947  5/1994  Sawaragi ................................. 524/780

FOREIGN PATENT DOCUMENTS 4247427   9/1992   Japan .
5271611  10/1993   Japan .
6220428   8/1994   Japan .
8295846  11/1996   Japan .
8311391  11/1996   Japan .
8311401  11/1996   Japan .
8311402  11/1996   Japan .
8311408  11/1996   Japan .

*Primary Examiner*—D. S. Nakarani
*Attorney, Agent, or Firm*—Ladas & Parry

[57] ABSTRACT

The present invention relates to a coating composition characterized in that an acetylacetonate having as the central metallic atom thereof Fe, Al, Sn or Ti, or a perchlorate, or a carboxylic acid or an anhydride thereof, and an acetylacetonate having as the central metallic atom thereof Li, Cu or Mn are incorporated in combination as curing catalysts; and to a composite structure characterized in that an antireflection film is provided on the surface of a coating film that is obtained from the above composition.

According to the present invention, a coating film which is drastically improved in transparency, optical properties and durability can be obtained. Moreover, this coating film has both high adhesion to an antireflection film made from an inorganic material, and durability. Further, according to the present invention, the pot life of a coating liquid when preserved at room temperature can be prolonged to 3 weeks or longer.

7 Claims, No Drawings

COATING COMPOSITION

TECHNICAL FIELD

The present invention relates to a coating composition useful for forming, on the surface of a synthetic-resin-made lens, a transparent film that is excellent in abrasion resistance, chemical resistance, warm water resistance, heat resistance, durability shown by weathering resistance and the like, and dye-affinity or dyeability. Further, the present invention also relates to a composite structure obtainable by providing an antireflection film of an inorganic material (hereinafter may also be referred to as "vapor-deposited inorganic film") on the above transparent film.

BACKGROUND ART

Synthetic-resin-made lenses, particularly those lenses which are made from diethylene glycol bis(allyl carbonate) resin (CR-39), are superior to glass-made lenses in safety, processability, appearance, and the like. Moreover, these synthetic-resin-made lenses have been spread rapidly in recent years due to the development of antireflection technique and hard coat technique.

To obtain a hard coat lens, there has generally been employed a method in which a silicon hard coat film is formed on the surface of a plastic lens. Japanese Patent Publications No. 11727/1985 and No. 30350/1985 disclose hard coat compositions with which acetylacetonates containing Al (III) as the central metallic atom thereof are used as curing catalysts.

Further, Japanese Patent Publication No. 33868/1986 discloses hard coat compositions to which amine compounds, polyvalent carboxylic acids, various metallic salt compounds of acetylacetone, phenolic compounds, boron-trifluoride-containing compounds and the like are added.

Furthermore, Japanese Patent Publication No. 9266/1987 discloses hard coat compositions with which ammonium salt of a peroxy acid is used, and Japanese Patent Publication No. 59601/1992 discloses hard coat compositions with which magnesium salt of a peroxy acid is used.

The hard coat compositions to which the above-described curing catalysts are added can give films which have no serious problems in fundamental properties. However, in order to prolong the lives of the composition liquids, complicated control such as pH adjustment is required, so that these compositions are not necessarily satisfactory.

DISCLOSURE OF THE INVENTION

We made earnest studies in order to solve the aforementioned problems, and, as a result, unexpectedly found that it is possible to harmoniously attain high productivity and excellent fundamental properties by the combination use of Fe, Al, Sn or Ti acetylacetonate, or a perchloric acid, or a carboxylic acid or an anhydride thereof, and Li, Cu or Mn acetylacetonate.

Further, we also found the following: when a composition comprising as its main components metallic oxide fine particles, a silane compound having a polymerizable reactive group, and a polyfunctional epoxy compound is used, the resulting thermally cured coating film has improved transparency and hardness, and also shows excellent dye-affinity and high adhesion (durability) to an inorganic vapor-deposited film; and a coating liquid of such a composition has a prolonged life.

BEST MODE FOR CARRYING OUT THE INVENTION

Accordingly, the present invention relates to a coating composition comprising (I) a polymerizable curing component, and (II) the following components (A) and (B) in combination as curing catalysts:

(A) at least one compound selected from the group consisting of:
(a) an acetylacetonate having as the central metallic atom thereof Fe (III), Al (III), Sn (IV) or Ti (IV),
(b) magnesium perchlorate or ammonium perchlorate,
(c) an aliphatic saturated or unsaturated carboxylic acid, or an aromatic carboxylic acids, or an anhydride thereof,
and a mixture of the above compounds; and
(B) an acetylacetonate having as the central metallic atom thereof Li (I), Cu (II), Mn (II) or Mn (III).

Conventionally-known components can be used as the polymerizable curing component, a main component of the coating composition.

In the present invention, a coating composition comprising as its main component the following (C), (D), (E) or (F), and a composite structure obtained by providing an antireflection film of an inorganic material on the surface of a film made from this coating composition show particularly excellent effects:

(C) fine particles comprising at least one metallic oxide selected from Si, Al, Sn, Sb, Ta, Ce, La, Fe, Zn, W, Zr, In and Ti oxides, and/or composite fine particles comprising at least two metallic oxides selected from Si, Al, Sn, Sb, Ta, Ce, La, Fe, Zn, W, Zr, In and Ti oxides, the diameters of the particles being from 1 to 100 millimicrons;

(D) an organosilicon compound represented by the general formula:

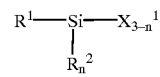

wherein $R^1$ is an organic group having a polymerizable reactive group, $R^2$ is a hydrocarbon group having 1 to 6 carbon atoms,
$X^1$ is a hydrolyzable group, and n is 0 or 1;

(E) an organosilicon compound represented by the following formula:

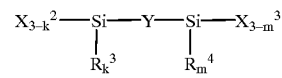

wherein $R^3$ and $R^4$ are a hydrocarbon group having 1 to 6 carbon atoms, $X^2$ and $X^3$ are a hydrolyzable group, Y is an organic group containing carbonate or epoxy group, and k and m are 0 or 1; and (F) a polyfunctional epoxy compound.

In the present invention, the combination use of the components (A) and (B) plays an extremely important role. Namely, the component (A) can fully show effects as a curing catalyst even when it is solely used. However, when the catalyst(s) of the component (A) is/are used together with the component (B), a coating film drastically improved in durability of various types and in productivity can be obtained. The co-use of the component (B) is particularly effective for prolonging the pot life of the composition (i.e., coating liquid).

Among the compounds belonging to the component (B), lithium acetylacetonate and manganese acetylacetonate are particularly preferred when the manifestation of their advantageous effects is taken into consideration.

Further, as specific examples of the component (C), fine particles comprising at least one metallic oxide selected from Si, Al, Sn, Sb, Ta, Ce, La, Fe, Zn, W, Zr, In and Ti oxides, and/or composite fine particles comprising at least two metallic oxides selected from Si, Al, Sn, Sb, Ta, Ce, La, Fe, Zn, W, Zr, In and Ti oxides, the diameters of the particles being from 1 to 100 millimeters, there can be preferably mentioned a dispersion of fine particles of an inorganic oxide such as $SiO_2$, $Al_2O_3$, $SnO_2$, $Sb_2O_5$, $Ta_2O_5$, $CeO_2$, $La_2O_3$, $Fe_2O_3$, ZnO, $WO_3$, $ZrO_2$, $In_2O_3$ or $TiO_2$ colloidally dispersed in a dispersion medium, for example, water or an organic solvent such as an alcohol, and a dispersion of composite fine particles consisting of two or more of the above inorganic oxides colloidally dispersed in a dispersion medium, for example, water or an organic solvent such as an alcohol.

Further, in order to improve the dispersion stability of these fine particles in a coating liquid, it is also possible to use them after treating their surfaces with an organosilicon compound or amine compound. Examples of organosilicon compounds that can be used for this treatment include monofunctional, difunctional, trifuntional and pentafunctional silanes. The treatment may be carried out without hydrolyzing hydrolyzable groups, or after hydrolyzing the same. Further, the state of the fine particles after the treatment is preferably such that the hydrolyzable groups have been reacted with —OH groups on the fine particles. However, even if some unreacted —OH groups are remaining, the stability is not affected at all. Examples of amine compounds that can be used for the treatment include ammonium, alkylamines such as ethylamine, triethylamine, isopropylamine and n-propylamine, aralkylamines such as benzylamine, alicyclic amines such as piperidine, and alkanolamines such as monoethanolamine and triethanolamine. The amount of the organosilicon compound or amine compound to be added is preferably about 1 to 15% of the weight of the fine particles. It is preferable that the particle diameter of any of the above-described fine particles be in the range of approximately 1 to 300 nm. The type and amount of the fine particles to be used in the coating composition of the present invention are decided depending upon the desired properties of the resulting coating film. It is however preferable to use the fine particles in an amount of 10 to 50% by weight of the total solid matter. When the amount of the fine particles is made to less than 10% by weight, such a tendency that the adhesion between the resulting coating film and a vapor-deposited inorganic film becomes insufficient or that the mar resistance of the resulting coating film becomes insufficient is promoted. On the other hand, when the amount of the fine particles is made to more than 50% by weight, the resulting coating film tends to be cracked. The dye-affinity (dyeability) of the coating film also becomes insufficient.

In the component (D), $R^1$ is an organic group having a polymerizable reactive group, and preferably a silane compound having a polymerizable reactive group such as vinyl, allyl, acryl, methacryl, epoxy, mercapto, cyano, isocyano or amino group; and $R^2$ is a hydrocarbon group having 1 to 6 carbon atoms, and preferable examples of this hydrocarbon group include methyl, ethyl, butyl, vinyl and phenyl groups. Further, $X^1$ is a hydrolyzable functional group, and preferable examples of this functional group include alkoxy groups such as methoxy, ethoxy and methoxyethoxy groups, halogen groups such as chloro and bromo groups, and acyloxy groups.

Specific examples of such a silane compound include vinyltrialkoxysilanes, vinyltrichlorosilane, vinyltri(beta-methoxy-ethoxy)silane, allyltrialkoxysilanes, acryloxypropyl-trialkoxysilanes, methacryloxypropyltrialkoxysilanes, methacryloxypropyldialkoxymethylsilanes, gamma-glycidoxypropyl-trialkoxysilanes, beta-(3,4-epoxycyclohexyl)-ethyltrialkoxy-silanes, mercaptopropyltrialkoxysilanes, gamma-aminopropyl-trialkoxysilanes, and N-beta(aminoethyl)-gamma-aminopropyl-methyldialkoxysilanes.

A mixture of two or more of these compounds may also be used as the component (D).

Further, it is more effective to adopt either one of the following manners: the component (D) is used after it is hydrolyzed; or the resulting coating film is subjected to an acid treatment after the film is cured.

The amount of the component (D) to be used is desirably from 20 to 60% by weight of the whole composition. When the amount of the component (D) is less than 20% by weight, the adhesion between the resulting coating film and a vapor-deposited inorganic film tends to be insufficient. On the other hand, when the amount of the component (D) is in excess of 60% by weight, the cured coating film tends to be cracked, so that such an amount is not preferred.

Next, regarding the component (E), $R^3$ and $R^4$ in the previously-mentioned general formula (E) are a hydrocarbon group having 1 to 6 carbon atoms. As specific examples of this hydrocarbon group, there can be preferably mentioned methyl, ethyl, butyl, vinyl and phenyl groups. Further, $X^2$ and $X^3$ are a hydrolyzable functional group, and preferable examples of this functional group include alkoxy groups such as methoxy, ethoxy and methoxyethoxy groups, halogen groups such as chloro and bromo groups, and acyloxy groups. Y is an organic group having carbonate or epoxy group, and preferable specific examples of this organic group include the following compounds:

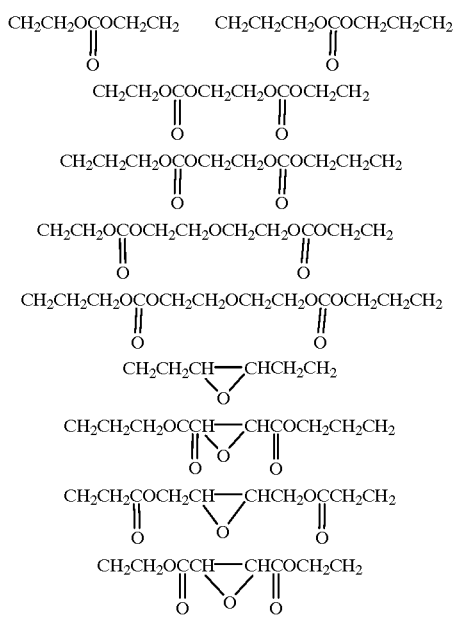

These disilane compounds can be synthesized by various conventionally-known methods.

For example, a disilane compound can be obtained by addition-reacting diallylcarbonate with trichlorosilane or the like, and then alkoxylating the addition product. Alternatively, a disilane compound can be obtained by reacting a compound having, at the both terminal ends thereof, substituents which can participate in addition reaction, and, in the inner part of the compound, functional groups which can be epoxidized, with trichlorosilane or the like by means of addition reaction, and then alkoxylating the addition product.

It is more effective to adopt either one of the following manners: the component (E) is used after it is hydrolyzed; or the resulting coating film is subjected to an acid treatment after it is cured.

The amount of the component (E) to be used is desirably from 3 to 40% by weight of the total solid matter. When the amount of the component (E) is less than 3% by weight, dye-affinity and various types of durability with a vapor-deposited inorganic film cannot be made compatible with each other. On the other hand, when the amount of the component (E) is in excess of 40% by weight, the resulting coating film has impaired water resistance. Moreover, the coating liquid has a shortened pot life.

To add the above-described component (E) is favorable for increasing the cure rate of the composition to improve the yield. It is particularly favorable that the cure time be shortened due to an increase in cure rate because such a possibility that dusts or impurities are adhered to the surface of a coating film during the step of forming the coating film becomes small. Further, the component (E) also has the effect of improving dye-affinity. Therefore, the addition of this component is advantageous in that the amount of the component (F), which will be described later, to be incorporated can be made small. In addition, the component (E) has also the excellent effect of hiding defective portions such as scratches existing on the surface of an object onto which the composition will be coated.

Polyfunctional epoxy compounds for use as the component (F) are widely used for coating materials, adhesive agents, casting materials, and the like. Examples of the polyfunctional epoxy compounds include polyolefin epoxy resins synthesized by a peroxidation process, alicyclic epoxy resins such as polyglycidyl ester obtainable from cyclopentadiene oxide, cyclohexene oxide or hexahydrophthalic acid and epichlorohydrin, polyglycidyl ethers obtainable from polyhydric phenols such as bisphenol A, catechol and resorcinol, or polyhydric alcohols such as (poly)ethylene glycol, (poly)propylene glycol, neopentyl glycol, glycerin, trimethylol propane, pentaerythritol, diglycerol and sorbitol, and epichlorohydrin, epoxidized vegetable oils, epoxy novolaks obtainable from novolak-type phenol resins and epichlorohydrin, epoxy resins obtainable from phenolphthalein and epichlorohydrin, copolymers of glycidyl methacrylate and methyl methacrylate acrylic monomer or styrene, and epoxy acrylates obtainable by means of glycidyl-ring-opening reaction between the above epoxy compounds and monocarboxylic-acid-containing (meth) acrylic acid.

Specific examples of preferable polyfunctional epoxy compounds include aliphatic epoxy compounds such as 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, diglycidyl ether of neopentyl glycol hydroxypivalic ester, trimethylolpropane diglycidyl ether, trimethylolpropane triglycidyl ether, glycerol diglycidyl ether, glycerol triglycidyl ether, diglycerol diglycidyl ether, diglycerol triglycidyl ether, diglycerol tetraglycidyl ether, pentaerythritol diglycidyl ether, pentaerythritol triglycidyl ether, pentaerythritol tetraglycidyl ether, dipentaerythritol tetraglycidyl ether, sorbitol tetraglycidyl ether, diglycidyl ether of tris-(2-hydroxyethyl)isocyanurate and triglycidyl ether of tris-(2-hydroxyethyl)isocyanurate; alicyclic epoxy compounds such as isophoronediol diglycidyl ether, bis-2,2-hydroxycyclohexyl-propane diglycidyl ether; and aromatic epoxy compounds such as resorcin diglycidyl ether, bisphenol A diglycidyl ether, bisphenol F diglycidyl ether, bisphenol S diglycidyl ether, orthophthalic diglycidyl ester, phenol novolak polyglycidyl ether and cresol novolak polyglycidyl ether.

In the present invention, the component (F) serves as a dye component, and, at the same time, acts for improving the resistance to water/warm water. Therefore, among the above-enumerated epoxy compounds, such aliphatic epoxy compounds as 1,6-hexanediol diglycidyl ether, diethylene glycol diglycidyl ether, trimethylolpropane diglycidyl ether, trimethylol propane triglycidyl ether, glycerol diglycidyl ether, glycerol triglycidyl ether and triglycidyl ether of tris(2-hydroxy-ethyl)isocyanurate are particularly preferred.

The amount of the component (F) to be used should be from 5 to 40% by weight of the whole composition. When the amount of the component (F) is less than 5% by weight, the resulting coating film is insufficient in water resistance. On the other hand, when the amount of the component (F) is in excess of 40% by weight, the adhesion between the resulting coating film and a vapor-deposited inorganic film tends to be insufficient, so that such an amount is unfavorable.

Further, it is also effective to add a tetrafunctional silane compound represented by the general formula $Si(OR)_4$. Specific examples of preferable tetrafunctional silane compounds include tetramethoxysilane, tetraethoxysilane, tetrapropoxysilane, tetraisopropoxysilane, tetrabutoxysilane, tetraphenoxysilane, tetraacetoxysilane, tetraallyloxysilane, tetrakis(2-methoxyethoxy)silane, tetrakis(2-ethylbutoxy)silane and tetrakis(2-ethylhexyloxy)silane.

These silane compounds can be used either singly or as a mixture of two or more. Further, it is preferable to use these silane compounds after hydrolyzing them in the presence of an acid without using any medium or in an organic solvent such as an alcohol.

The coating composition thus obtained can be diluted, if necessary, with a solvent. Examples of solvents that can be used include alcohols, esters, ketones, ethers and aromatics.

To the coating composition of the present invention, small amounts of surface active agents, antistatic agents, ultraviolet absorbers, antioxidants, disperse dyes, oil-soluble dyes, fluorescent dyes, pigments, photochromic compounds, light/heat stabilizers of hindered amine or hindered phenol type, and the like can be added, as needed, besides the above-described components. It is thus possible to obtain a coating liquid having improved application properties, and a cured coating film having improved properties.

Further, in order to improve the adhesion between a substrate lens and a coating film formed thereon, it is effective to subject the surface of the substrate to an alkali treatment, acid treatment, surface active agent treatment, polishing treatment using inorganic or organic fine particles, primer treatment or plasma treatment before the coating composition of the present invention is coated onto the substrate.

A coating film can be formed by applying a coating liquid by a dipping, spinner, spray or flow method, followed by heating at a temperature of 40 to 200° C. for several hours for drying. In particular, when a coating film is formed on a substrate whose deflection temperature under load is lower than 100° C., a spinner method, in which it is not necessary to fix a lens substrate by a jig, is suitable.

It is preferable that the thickness of the cured coating film be from 0.05 to 30 micrometers. A coating film having a thickness smaller than 0.05 micrometers is not favorable because such a film cannot show fundamental properties. On the other hand, a coating film having a thickness larger than 30 micrometers has decreased surface smoothness and causes optical distortion, so that such a thickness is unfavorable.

The application of the coating composition of the present invention can be performed by a dipping, spray, roll coating, spin coating or flow coating method, or the like.

On the surface of the coating film thus formed, an antireflection film of an inorganic material can be formed by means of vacuum deposition, ion plating, sputtering, or the like. When vacuum deposition is conducted, there may be employed an ion-beam-assisting method in which ion beam is also applied while vapor deposition is performed. Further, the antireflection film may be either a single-layer film or a multi-layered film.

Specific examples of preferable inorganic materials that can be used for the vacuum deposition include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, and $WO_3$. These inorganic materials are used either singly or as a mixture of two or more.

When the antireflection film is formed, it is preferable to subject the hard coat film to a surface treatment. Specific examples of this surface treatment include an acid treatment, an alkali treatment, an ultraviolet-light irradiation treatment, a plasma treatment to be carried out by means of high-frequency discharge in an argon or oxygen atmosphere, and an ion-beam irradiation treatment using argon, oxygen or nitrogen.

The present invention will now be explained more specifically by referring to the following examples. However, the present invention is not limited by these examples.

EXAMPLE 1

(1) Preparation of Coating Liquid 1,832 g of methanol, 785 g of 1,4-dioxane, 5,332 g of a sol of titanium dioxide-iron trioxide-silicon dioxide composite fine particles dispersed in methyl cellosolve (manufactured by Catalysts & Chemicals Industries Co., Ltd., solid matter concentration: 20% by weight), 102 g of colloidal silica dispersed in methanol (trade name "Osker 1132" manufactured by Catalysts & Chemicals Industries Co., Ltd., solid matter concentration: 30% by weight), and 902 g of gamma-glycidoxy-propyltrimethoxysilane were mixed. To this mixture was added dropwise 250 g of a 0.05 N aqueous hydrochloric acid solution with stirring. The resulting mixture was stirred for a further 4 hours, and then aged for a whole day and night. To this liquid, 762 g of 1,6-hexanediol diglycidyl ether (trade name "Denacol EX-212" manufactured by Nagase Chemicals, Ltd.) was added, and then 37 g of $Mg(ClO_4)_2$, 5.5 g of $Li(C_5H_7O_2)$, 3 g of a silicon surface active agent (trade name "L-7001" manufactured by Nippon Unicar Co., Ltd.), and 6 g of a hindered amine photostabilizer (trade name "Sanor LS-770" manufactured by Sankyo Co., Ltd.) were further added. The resulting mixture was stirred for 4 hours, and then aged for a whole day and night to obtain a coating liquid.

(2) Coating and Curing

The coating liquid thus obtained was coated, by means of dipping, onto a spectacle lens with a refractive index of 1.60 (manufactured by Seiko Epson Corporation, a lens substrate for "Seiko Super Luscious") which had been subjected to an alkali treatment. The pull-up rate was 23 cm/min. The coating liquid coated onto the lens was then air-dried at 80° C. for 20 minutes, followed by baking at 130° C. for 60 minutes. The cured film thus obtained had a thickness of approximately 2 microns, and was excellent in both appearance and dye-affinity.

EXAMPLE 2

On the lens obtained in Example 1, an antireflection thin coating film was formed by the following method, using an inorganic material.

(1) Formation of Antireflection Thin Film

The lens obtained by the above-described method was subjected to a plasma treatment (argon plasma 400 W×60 seconds). A multi-layered antireflection film composed of five layers of $SiO_2$, $ZrO_2$, $SiO_2$, $ZrO_2$ and $SiO_2$, which were successively laminated in the mentioned order from the substrate side to the air side, was then formed on the lens by means of vacuum deposition ("BMC-1000", manufactured by Shinku Kikai Kogyo Kabushiki Kaisha). Each layer was formed so that the optical film thicknesses of the first $SiO_2$ layer, the next $ZrO_2$ and $SiO_2$ equivalent layers, the next $ZrO_2$ layer, and the uppermost $SiO_2$ layer would respectively be $\lambda/4$. It is noted that the design wavelength $\lambda$ was 520 nm.

The reflective interference color of the multi-layered film obtained was green, and the total light transmittance of the film was 98%.

(2) Tests & Results of Evaluation

The lens obtained in Example 1 (hereinafter referred to as "hard coat lens"), and the lens obtained in Example 2 (hereinafter referred to as "hard multicoat lens") were tested by the following respective methods. The results are shown in Table 1.

(a) Abrasion (Scratch) resistance: A load of 1 kg was applied to the lens, and the surface of the lens was rubbed reciprocatingly 10 times with "Bonstar #0000 Steel Wool" (manufactured by Japan Steel Wool Co., Ltd.). The degree of scratching was visually observed, and evaluated according to the following standards:

A: no scratches are found at all in the area of 1 cm×3 cm;

B: 1 to 10 scratches are found in the above area;

C: 10 to 100 scratches are found in the above area;

D: countless scratches are found, but some smooth portions are remaining on the surface; and E: no smooth portions are remaining due to the scratches made on the surface.

(b) Water resistance & chemical resistance: The lens was dipped in water, alcohol, or kerosene for 48 hours. A lens whose surface underwent no change was taken as "good".

(c) Acid resistance & detergent resistance: The lens was dipped in 0.1 N hydrochloric acid, or in a 1% aqueous solution of "Mama Lemon" (manufactured by Lion Corporation) for 12 hours. A lens whose surface underwent no change was taken as "good".

(d) Adhesion: The adhesion between the substrate and the hard coat film, and the adhesion between the hard coat film and the multicoat film were determined by the cross-cut tape test according to JIS D-0202. Namely, the surface of the substrate was incised with the space of 1 mm by using a knife, thereby forming 100 pieces of 1 $mm^2$ squares. On this, a cellophane adhesive tape (trade name "Cellotape" manufactured by Nichiban Co., Ltd.) was strongly pressed, and then instantly peeled off at an angle of 90 degrees. The number of the squares remaining on the substrate was used as an index to adhesion.

(e) Weathering resistance: The lens was exposed to xenon lamp light for 400 hours by using a sunshine weatherometer. A lens whose surface underwent no change was taken as "good".

(f) Heat resistance (cooling cycle properties): After the lens was allowed to stand in a stream of hot air at 70° C. for 1 hour, the condition of the lens surface was observed. Thereafter, the lens was subjected to the cycle of –5° C. for 15 minutes and 60° C. for 15 minutes; this cycle was repeated five times. A lens whose surface underwent no change was taken as "good".

(g) Durability: By taking it into consideration that durability is substantially related to adhesion, the lens which had been used in the tests (a) to (f) was subjected to the above-described cross-cut tape test. A lens whose coating film was free from peeling was taken as "good".

(h) Dye-affinity (only for the hard coat lens): A dye solution was prepared by dispersing 2 g of Amber D, a dye for "Seiko Plucks Diacoat", in 1 litter of pure water at 92° C. The lens was dipped in this dye solution for 5 minutes to dye the lens. A lens which was evenly dyed and whose total light transmittance was such that the difference between the total light transmittances before and after the dyeing step was 20% or more was taken as "good".

(i) Pot life of coating liquid: A coating liquid was prepared, and then preserved at 20° C. for 3 weeks Thereafter, it was coated onto a substrate and cured by the above-described method, and the resulting hard coat lens was examined in terms of various types of durability and dye-affinity. With respect to durability, such a coating liquid that the durability of a lens coated with the coating liquid after preserved was not lower than that of a lens coated with the coating liquid before the preservation was taken as "good". With respect to dye-affinity, a coating liquid which can evenly dye a lens and which can make the difference between the total light transmittance of a lens coated with the coating liquid before the preservation and that of a lens coated with the coating liquid after preserved to 3% or less was taken as "good".

EXAMPLE 3

(1) Preparation of Coating Liquid 383 g of butyl cellosolve, 416 g of a sol of cerium dioxide-titanium dioxide-silicon dioxide composite fine particles dispersed in methyl cellosolve (trade name "Optolake 1832" manufactured by Catalysts & Chemicals Industries Co., Ltd., solid matter concentration: 20% by weight), and 95 g of gamma-glycidoxypropyltrimethoxysilane were mixed. To this mixture was added dropwise 27 g of a 0.1 N aqueous hydrochloric acid solution with stirring. The resulting mixture was stirred for a further 4 hours, and then aged for a whole day and night. To this liquid, 77 g of glycerol triglycidyl ether (trade name "Denacol EX-314" manufactured by Nagase Chemicals, Ltd.) was added, and then 2 g of $Fe(C_5H_7O_2)_3$, 1.1 g of $Mn(C_5H_7O_2)_2$, 0.3 g of a silicon surface active agent (trade name "FZ-2110" manufactured by Nippon Unicar Co., Ltd.), and 0.7 g of a phenolic antioxidant (trade name "Antage Crystal" manufactured by Kawaguchi Chemical Industry Co., Ltd.) were further added. The resulting mixture was stirred for 4 hours, and then aged for a whole day and night to obtain a coating liquid.

(2) Coating and Curing

The coating liquid thus obtained was coated onto a spectacle lens with a refractive index of 1.66 (manufactured by Seiko Epson Corporation, a lens substrate for "Seiko Super Sovereign") by a spinner method.

The coating conditions were as follows:

at the number of revolutions of 500 rpm for 10 seconds (during this period, the coating liquid was coated);

at the number of revolutions of 2,000 rpm for 1 second; and at the number of revolutions of 500 rpm for 5 seconds.

The coating liquid coated onto the lens was then air-dried at 80° C. for 20 minutes, followed by baking at 130° C. for 60 minutes. The cured film thus obtained had a thickness of approximately 2.3 microns, and was excellent in both appearance and dye-affinity.

(3) Tests & Results of Evaluation

The lens thus obtained was tested by the same methods as in Example 1. The results are shown in Table 1.

EXAMPLE 4

(1) Formation of Antireflection Thin Film

The lens obtained by the above-described method was subjected to a plasma treatment (argon plasma 400 W×60 seconds). A multi-layered antireflection film composed of four layers of $ZrO_2$, $SiO_2$, $ZrO_2$ and $SiO_2$, which were successively laminated in the mentioned order from the substrate side to the air side, was then formed on the lens by means of vacuum deposition ("BMC-1000", manufactured by Shinku Kikai Kogyo Kabushiki Kaisha). Each layer was formed so that the optical film thicknesses of the first $ZrO_2$ and $SiO_2$ equivalent layers, the next $ZrO_2$ layer, and the uppermost $SiO_2$ layer would respectively be $\lambda/4$. It is noted that the design wavelength $\lambda$ was 520 nm.

The reflective interference color of the multi-layered film obtained was green, and the total light transmittance of the film was 98%.

(2) Tests & Results of Evaluation

The lens thus obtained was tested by the same methods as in Example 2. The results are shown in Table 1.

EXAMPLE 5

(1) Preparation of Coating Liquid 385 g of isopropyl cellosolve, 112 g of pure water, and 290 g of a sol of tin dioxide-tungsten dioxide composite fine particles dispersed in methanol (manufactured by Nissan Chemical Industries, Ltd., solid matter concentration: 30% by weight) were mixed. The mixture was then mixed with 97 g of gamma-methacryloxy-propyltrimethoxysilane, 51 g of gamma-glycidoxypropyl-trimethoxysilane, and 16 g of tetramethoxy-silane. To this mixture was added dropwise 50 g of a 0.1 N aqueous hydrochloric acid solution with stirring, and the resulting mixture was stirred for 5 hours. To this liquid, 2 g of $SnCl_2(C_5H_7O_2)_2$, 0.8 g of $Cu(C_5H_7O_2)_2$, and 0.3 g of a silicon surface active agent (trade name "L-7604" manufactured by Nippon Unicar Co., Ltd.) were further added. The resulting mixture was stirred for 4 hours, and then aged for a whole day and night to obtain a coating liquid.

(2) Coating and Curing

The coating liquid thus obtained was coated onto a polycarbonate-injection-molded spectacle lens with a refractive index of 1.58 by a spinner method. The coating conditions were the same as those used in Example 3.

The coating liquid coated onto the lens was then air-dried at 80° C. for 15 minutes, followed by baking at 130° C. for 60 minutes. The cured film thus obtained had a thickness of approximately 2.1 microns, and was excellent in appearance.

(3) Formation of Antireflection Film

On the lens obtained by the above-described method, an antireflection film was formed by the same method as in Example 4 except that the $ZrO_2$ used in Example 4 was replaced with a mixture of $ZrO_2$ and Ti oxide ($ZrO_2$/Ti oxide=65/35 (weight ratio)).

The reflective interference color of the multi-layered film obtained was green, and the total light transmittance of the film was 99%.

(4) Tests & Results of Evaluation

The lens thus obtained was tested by the same methods as in Example 2. The results are shown in Table 1. It is noted that dye-affinity was evaluated by using the lens in a state of hard coat lens.

EXAMPLE 6

(1) Preparation of Coating Liquid 390 g of methyl cellosolve, and 372 g of a sol of antimony pentaoxide fine particles dispersed in water (manufactured by Nissan Chemical Industries, Ltd., solid matter concentration: 30% by weight) were mixed. The mixture was then mixed with 69 g of gamma-glycidoxy-propylmethyldimethoxysilane and 66 g of gamma-glycidoxy-propyltrimethoxysilane. To this mixture was added dropwise 30 g of a 0.05 N aqueous hydrochloric acid solution with stirring. The resulting mixture was stirred for 4 hours, and then aged for a whole day and night. To this liquid, 73 g of glycerol diglycidyl ether (trade name "Denacol EX-313" manufactured by Nagase Chemicals, Ltd.) was added, and then 8.5 g of maleic anhydride, 1.9 g of $Li(C_5H_7O_2)$, and 0.2 g of a silicon surface active agent (trade name "BYK-300" manufactured by BYK-Chemie Japan, K.K.) were further added. The resulting mixture was stirred for 4 hours, and then aged for a whole day and night to obtain a coating liquid.

(2) Coating and Curing

The coating liquid thus obtained was coated onto a spectacle lens with a refractive index of 1.56 (manufactured by Seiko Epson Corporation, a lens substrate for "Seiko Plucks IIGX") by means of spraying.

The spraying was conducted by using an "Iwata Wider 61" (manufactured by Iwata Coating Machine Co., Ltd., nozzle diameter 1 mm). The spray pressure was 3 kg/cm$^2$, and the amount of the coating liquid discharged was 100 ml/min.

The coating liquid coated onto the lens was then air-dried at 80° C. for 10 minutes, followed by baking at 130° C. for 60 minutes. The cured film thus obtained had a thickness of approximately 4 microns, and was excellent in both appearance and dye-affinity.

(3) Tests & Results of Evaluation

The lens thus obtained was tested by the same methods as in Example 1. The results are shown in Table 1.

EXAMPLE 7

(1) Formation of Antireflection Thin Film

The lens obtained in Example 6 was subjected to an ion-beam irradiation treatment using oxygen gas (accelerating voltage 500 V×60 seconds). A multi-layered antireflection film composed of five layers of $SiO_2$, $ZrO_2$, $SiO_2$, $TiO_2$ and $SiO_2$, which were successively laminated in the mentioned order from the substrate side to the air side, was formed on the lens by means of vacuum deposition ("BMC-1000", manufactured by Shinku Kikai Kogyo Kabushiki Kaisha), provided that the fourth layer was formed by the ion-beam-assisted vapor deposition of $TiO_2$. Each vapor-deposited layer was formed so that the optical film thicknesses of the first $SiO_2$ and the second $ZrO_2$ and $SiO_2$ equivalent layers would be $\lambda/4$, that the $TiO_2$ layer would be $\lambda/2$, and that the uppermost $SiO_2$ layer would be $\lambda/4$. It is noted that the design wavelength was 520 nm.

The reflective interference color of the multi-layered film obtained was green, and the total light transmittance of the film was 99%.

(2) Tests & Results of Evaluation

The lens thus obtained was tested by the same methods as in Example 2. The results are shown in Table 1.

EXAMPLE 8

(1) Preparation of Coating Liquid 342 g of isopropyl cellosolve, 100 g of pure water, 338 g of a sol of $SiO_2$ fine particles dispersed in methyl cellosolve (trade name "Osker 1832" manufactured by Catalysts & Chemicals Industries Co., Ltd., solid matter concentration: 30% by weight), 92 g of gamma-glycidoxypropyltrimethoxysilane, and 31 g of bis[3-(diethoxymethylsilyl)propyl]carbonate were mixed. To this mixture was added dropwise 37 g of a 0.1 N aqueous hydrochloric acid solution with stirring, and the resulting mixture was stirred for a further 5 hours. To this liquid, 63 g of pentaerythritol tetraglycidyl ether (trade name "Denacol EX-411" manufactured by Nagase Chemicals, Ltd.), 3.2 g of $Al(C_5H_7O_2)_3$, 1 g of $Mn(C_5H_7O_2)_3$, and 0.3 g of a silicon surface active agent (trade name "L-7604" manufactured by Nippon Unicar Co., Ltd.) were further added. The resulting mixture was stirred for 4 hours, and then aged for a whole day and night to obtain a coating liquid.

(2) Coating and Curing

The coating liquid thus obtained was coated onto a CR-39-made spectacle lens with a refractive index of 1.50 by a spinner method. The coating conditions were the same as those used in Example 3.

The coating liquid coated onto the lens was then air-dried at 80° C. for 15 minutes, followed by baking at 130° C. for 2 hours. The cured film thus obtained had a thickness of approximately 2.1 microns, and was excellent in both appearance and dye-affinity. No defect due to the deposition of dusts was found.

(3) Formation of Antireflection Film

On the lens obtained by the above-described method, an antireflection film was formed by the same method as in Example 4 except that the $ZrO_2$ used in Example 4 was replaced with a mixture of $ZrO_2$ and Ti oxide ($ZrO_2$/Ti oxide=65/35 (weight ratio)).

The reflective interference color of the multi-layered film obtained was green, and the total light transmittance of the film was 99%.

(4) Tests & Results of Evaluation

The lens thus obtained was tested by the same methods as in Example 2. The results are shown in Table 1. It is noted that dye-affinity was evaluated by using the lens in a state of hard coat lens.

EXAMPLE 9

(1) Preparation of Coating Liquid 1,830 g of butyl cellosolve, 5,683 g of a sol of titanium dioxide-zirconium dioxide-silicon dioxide composite fine particles dispersed in methanol (manufactured by Catalysts & Chemicals Industries Co., Ltd., solid matter concentration: 20% by weight), and 1,922 g of gamma-glycidoxypropyltrimethoxy-silane were mixed. To this mixture was added dropwise 528 g of a 0.05 N aqueous hydrochloric acid solution with stirring. The resulting mixture was stirred for 4 hours, and then aged for a whole day and night. To this liquid, 36 g of $Fe(C_5H_7O_2)_3$, 5 g of $Li(C_5H_7O_2)$, and 3 g of a silicon surface active agent (trade name "L-7001" manufactured by Nippon Unicar Co., Ltd.) were further added. The resulting mixture was stirred for 4 hours, and then aged for a whole day and night to obtain a coating liquid.

(2) Coating and Curing

The coating liquid thus obtained was coated, by means of dipping, onto a spectacle lens with a refractive index of 1.60

(manufactured by Seiko Epson Corporation, a lens substrate for "Seiko Super Luscious") which had been subjected to an alkali treatment. The pull-up rate was 18 cm/min. The coating liquid coated onto the lens was then air-dried at 80° C. for 20 minutes, followed by baking at 130° C. for 120 minutes. The cured film thus obtained had a thickness of approximately 2 microns, and was excellent in appearance.

(3) Formation of Antireflection Film

On the lens obtained by the above-described method, an antireflection film was formed by the same method as in Example 8.

The reflective interference color of the multi-layered film obtained was green, and the total light transmittance of the film was 99%.

(4) Tests & Results of Evaluation

The lens thus obtained was tested by the same methods as in Example 2. The results are shown in Table 1. It is noted that dye-affinity was evaluated by using the lens in a state of hard coat lens.

Comparative Example 1

The procedure of Example 1 was repeated except that $Li(C_5H_7O_2)$ was not added, thereby coating the coating liquid onto the lens.

The lens thus obtained was tested by the previously-mentioned methods. The results are shown in Table 1.

Comparative Example 2

The procedure of Example 1 was repeated except that $Mg(ClO_4)_2$ was not added, thereby coating the coating liquid onto the lens.

The lens thus obtained was tested by the same methods as in Example 1. The results are shown in Table 1.

Comparative Example 3

The procedure of Example 3 was repeated except that $Fe(C_5H_7O_2)3$ was not added and that the amount of $Mn(C_5H_7O_2)3$ was changed to 3 g, thereby coating the coating liquid onto the lens.

The lens thus obtained was tested by the same methods as in Example 1. The results are shown in Table 1.

EXAMPLE 10

(1) Preparation of Coating Liquid 1,144 g of methanol, 6,113 g of a sol of titanium dioxide-iron trioxide-silicon dioxide composite fine particles dispersed in methyl cellosolve (manufactured by Catalysts & Chemicals Industries Co., Ltd., solid matter concentration: 20% by weight ), 1056 g of gamma-glycidoxypropyltrimethoxysilane, and 610 g of bis[3-(diethoxymethylsilyl)ethyl]carbonate were mixed. To this mixture was added dropwise 420 g of a 0.05 N aqueous hydrochloric acid solution with stirring. The resulting mixture was stirred for a further 4 hours, and then aged for a whole day and night. To this liquid, 609 g of 1,6-hexanediol diglycidyl ether (trade name "Denacol EX-212" manufactured by Nagase Chemicals, Ltd.) was added, and then 36 g of $Mg(ClO_4)_2$, 5.3 g of $Al(C_5H_7O_2)_3$, 5.7 g of $Mn(C_5H_7O_2)_2$, 3 g of a silicon surface active agent (trade name "L-7001" manufactured by Nippon Unicar Co., Ltd.), and 6 g of a hindered amine photostabilizer (trade name "Sanor LS-770" manufactured by Sankyo Co., Ltd.) were further added. The resulting mixture was stirred for 4 hours, and then aged for a whole day and night to obtain a coating liquid.

(2) Coating and Curing

The coating liquid thus obtained was coated, by means of dipping, onto a spectacle lens with a refractive index of 1.60 (manufactured by Seiko Epson Corporation, a lens substrate for "Seiko Super Luscious") which had been subjected to an alkali treatment. The pull-up rate was 20 cm/min. The coating liquid coated onto the lens was then air-dried at 80° C. for 20 minutes, followed by baking at 130° C. for 60 minutes. The cured film thus obtained had a thickness of approximately 1.8 microns, and was excellent in both appearance and dye-affinity. No defect due to the deposition of dusts was found.

(3) Tests & Results of Evaluation

The lens thus obtained was tested by the same methods as in Example 1. The results are shown in Table 1.

EXAMPLE 11

On the lens obtained in Example 10, an antireflection thin coating film was formed by the following method, using an inorganic material.

(1) Formation of Antireflection Thin Film

The lens obtained by the above-described method was subjected to a plasma treatment (argon plasma 400 W×60 seconds). A multi-layered antireflection film composed of five layers of $SiO_2$, $ZrO_2$, $SiO_2$, $ZrO_2$ and $SiO_2$, which were successively laminated in the mentioned order from the substrate side to the air side, was then formed on the lens by means of vacuum deposition ("BMC-1000", manufactured by Shinku Kikai Kogyo Kabushiki Kaisha). Each layer was formed so that the optical film thicknesses of the first $SiO_2$ layer, the next $ZrO_2$ and $SiO_2$ equivalent layers, the next $ZrO_2$ layer, and the uppermost $SiO_2$ layer would respectively be $\lambda/4$. It is noted that the design wavelength $\lambda$ was 520 nm.

The reflective interference color of the multi-layered film obtained was green, and the total light transmittance of the film was 98%.

(2) Tests & Results of Evaluation

The lens thus obtained was tested by the same methods as in Example 2. The results are shown in Table 1.

EXAMPLE 12

(1) Preparation of Coating Liquid 3,780 g of ethyl cellosolve, 4,160 g of a sol of titanium dioxide-zirconium dioxide-silicon dioxide composite fine particles dispersed in methanol (manufactured by Catalysts & Chemicals Industries Co., Ltd., solid matter concentration: 20% by weight), 987 g of gamma-glycidoxypropyltrimethoxysilane, 622 g of gamma-methacryloxypropyltrimethoxysilane, and bis[3-(diethoxymethylsilyl)ethyl]epoxide were mixed. To this mixture was added dropwise 435 g of a 0.05 N aqueous hydrochloric acid solution with stirring. The resulting mixture was stirred for 4 hours, and then aged for a whole day and night. To this liquid, 14 g of maleic anhydride, 3.2 g of $Fe(C_5H_7O_2)_3$, 5.3 g of $Li(C_5H_7O_2)$, and 3 g of a silicon surface active agent (trade name "L-7001" manufactured by Nippon Unicar Co., Ltd.) were further added. The resulting mixture was stirred for 4 hours, and then aged for a whole day and night to obtain a coating liquid.

(2) Coating and Curing

The coating liquid thus obtained was coated, by means of dipping, onto a spectacle lens with a refractive index of 1.67 (manufactured by Seiko Epson Corporation, a lens substrate for "Seiko Super Sovereign") which had been subjected to a plasma treatment (argon plasma: 200 W×60 seconds). The pull-up rate was 26 cm/min. The coating liquid coated onto the lens was then air-dried at 80° C. for 20 minutes, followed by baking at 130° C. for 120 minutes. The cured film thus obtained had a thickness of approximately 2 microns, and was excellent in appearance. No defect due to the deposition of dusts was found.

(3) Formation of Antireflection Thin Film

On the lens obtained by the above-described method, an antireflection film was formed by the same method as in Example 8.

The reflective interference color of the multi-layered film obtained was green, and the total light transmittance of the film was 99%.

(4) Tests & Results of Evaluation

The lens thus obtained was tested by the same methods as in Example 2. The results are shown in Table 1. It is noted that dye-affinity was evaluated by using the lens in a state of hard coat lens.

TABLE 1

| No. | Appearance | (a) Abrasion resistance | (b) Water/ Chemical resistance | (c) Acid/detergent resistance | (d) Adhesion | (e) Weathering resistance | (f) Heat resistance | (g) Durability | (h) Dye- affinity | (i) Pot life | Total light transmittance |
|---|---|---|---|---|---|---|---|---|---|---|---|
| Example 1 | ⊚ | A | o | o | 100/100 | o | o | o | o | o | 89% |
| Example 2 | ⊚ | A | o | o | 100/100 | o | o | o | — | — | 98% |
| Example 3 | ⊚ | A | o | o | 100/100 | o | o | o | o | o | 88% |
| Example 4 | ⊚ | A | o | o | 100/100 | o | o | o | — | — | 98% |
| Example 5 | ⊚ | A | o | o | 100/100 | o | o | o | — | o | 99% |
| Example 6 | ⊚ | A | o | o | 100/100 | o | o | o | o | o | 90% |
| Example 7 | ⊚ | A | o | o | 100/100 | o | o | o | — | — | 99% |
| Example 8 | ⊚ | A | o | o | 100/100 | o | o | o | o | o | 99% |
| Example 9 | ⊚ | A | o | o | 100/100 | o | o | o | — | o | 99% |
| Example 10 | ⊚ | A | o | o | 100/100 | o | o | o | o | o | 89% |
| Example 11 | ⊚ | A | o | o | 100/100 | o | o | o | — | — | 98% |
| Example 12 | ⊚ | A | o | o | 100/100 | o | o | o | o | o | 99% |
| Comparative Example 1 | ⊚ | B | o | o | 100/100 | o | o | o | o | x | 89% |
| Comparative Example 2 | ⊚ | E | o | o | 100/100 | o | o | x | x | x | 89% |
| Comparative Example 3 | ⊚ | D | o | o | 100/100 | o | o | x | x | x | 88% |

⊚: excellent
o: good
x: poor

As described above in detail, according to the present invention, it is possible to increase surface (scratch) hardness and to remarkably prolong the pot life of a coating liquid without requiring any complicated control. The present invention is applicable to plastic lens materials such as (meth)acrylic resins, styrene resins, carbonate resins, allyl resins, allyl carbonate resins, vinyl resins, polyester resins, polyether resins and urethane resins, and also to those resins which have various functions, such as polymers of novel monomers and comonomers.

Plastic materials having excellent productivity (coating liquids require no complicated control, and their pot life is long) and durability of various types can be widely utilized for spectacle lenses, camera lenses, light-beam fluorescent lenses and light-diffusing lenses which are used in our daily life or in the industrial fields. Moreover, the present invention can also be applied to or utilized for transparent plastics having optical uses such as transparent glasses and cover glasses that are used for watch glasses and cover glasses for displays. The present invention is thus extremely useful from the industrial point of view.

What is claimed is:

1. A coating composition comprising a polymerizable curing component, and, as curing catalysts, the following components (A) and (B):

(A) at least one compound selected from the group consisting of:
 (a) an acetylacetonate having as the central metallic atom thereof Fe (III), Al (III), Sn (IV) or Ti (IV),
 (b) magnesium perchlorate or ammonium perchlorate, and mixture thereof; and
(B) an acetylacetonate having as the central metallic atom thereof Li (I), Cu (II), Mn (II) or Mn (III).

2. The coating composition according to claim 1, wherein the composition further comprises the following components (C) and (D):

(C) fine particles comprising at least one metallic oxide selected from Si, Al, Sn, Sb, Ta, Ce, La, Fe, Zn, W, Zr, In and Ti oxides, and/or composite fine particles comprising at least two metallic oxides selected from Si, Al, Sn, Sb, Ta, Ce, La, Fe, Zn, W, Zr, In and Ti oxides, the diameters of the particles being from 1 to 100 millimicrons;

(D) an organosilicon compound represented by the general formula:

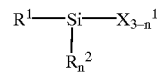

wherein $R^1$ is an organic group having a polymerizable reactive group, $R^2$ is a hydrocarbon group having 1 to 6 carbon atoms, $X^1$ is a hydrolyzable group, and n is 0 or 1.

3. The coating composition according to claim 1, wherein the composition comprises a polyfunctional epoxy compound as a component (F).

4. A composite structure comprising a substrate, a coating film comprising a cured product of a coating composition according to claim 1, formed on the substrate, and an antireflection film comprising an inorganic material provided on the surface of the coating film.

5. An optical article having the composite structure according to claim 4.

6. An spectacle lens having the composite structure according to claim 5.

7. A coating composition comprising a polymerizable curing component, and, as curing catalysts, the following components (A) and (B):

(A) at least one compound selected from the group consisting of (a) an acetylacetonate having as the central metallic atom thereof Fe (III), Al (III), Sn (IV) or Ti (IV), (b) magnesium perchlorate or ammonium perchlorate, (c) an aliphatic saturated or unsaturated carboxylic acid, or an aromatic carboxylic acid, or an anhydride thereof, and mixture thereof, and (B) an acetylacetonate having as the central metallic atom thereof Li (I), Cu (II), Mn (II) or Mn (III), wherein the composition further comprises an organosilicon compound represented by the following formula (E):

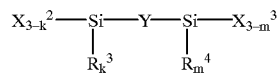

(E)

wherein $R^3$ and $R^4$ are a hydrocarbon group having 1 to 6 carbon atoms, $X^2$ and $X^3$ are a hydrolyzable group, Y is an organic group containing a carbonate or epoxy group, and k and m are 0 or 1.

* * * * *